United States Patent Office 3,210,417
Patented Oct. 5, 1965

3,210,417
PREPARATION OF ACRYLIC MONOMERS
Edwin Marvin Smolin, Springdale, and Ken Matsuda, Stamford, Conn., assignors to American Cyanamid Company, New York, N.Y., a corporation of Maine
No Drawing. Filed Dec. 29, 1961, Ser. No. 163,036
12 Claims. (Cl. 260—533)

This invention relates to a process for the preparation of acrylic acid and acrylic acid esters. More particularly, it relates to a liquid phase reaction whereby acetylene, carbon monoxide and either water or an alcohol, respectively, all being present in equivalent amounts, are reacted at elevated temperatures and pressures in the presence of a nickel halide catalyst. Still more particularly, it is concerned with an improved process whereby the overall reaction time is lessened by having present within the reaction mixture a novel activator.

It is well known that equivalent quantities of acetylene, carbon monoxide and water or an alcohol may be reacted in the liquid phase to give either acrylic acid or an acrylic acid ester, respectively, providing elevated temperatures, elevated pressures and a nickel salt catalyst are used. However, this process is not entirely satisfactory and leaves much to be desired. For example, in high pressure, liquid phase reactions, as previously practiced, the time for initiating the reaction is unduly long. In order to reduce this time of initiation, various expedients have been resorted to. Such expedients, however, have not been entirely satisfactory in that in several of them, at least, not infrequently, polymerization and other reactions of acrylic acid and its esters occur with attendant loss in yield.

Since acrylic acid and acrylic acid esters find extensive use in the manufacture of synthetic resins for application in surface coatings, adhesives, etc., an improved procedure for their manufacture has long been desired.

It has now been discovered that the disadvantages of the prior art practices for the preparation of acrylic acid and acrylic acid esters may be largely obviated by a novel method of increasing the activity of a nickel halide catalyst employed in such reactions. In accordance with the present invention, it has been found that the reaction of acetylene, carbon monoxide and either water or alcohol and a nickel halide catalyst may be initiated in a rapid fashion by having present in the reaction mixture a small amount of 2,2'-bis-(4,5,6,7 - tetrahydro-1,3-diazepine), which compound is capable of forming with the nickel halide a complex compound which is best described as a nickel halide complex of 2,2'-bis-(4,5,6,7-tetrahydro-1,3-diazepine).

2,2' - bis - (4,5,6,7-tetrahydro-1,3-diazepine) which is characterized as a cream-colored to colorless solid having a melting point of 91° C.–92.5° C. and which is soluble in a variety of solvents such as acetonitrile, benzene, chloroform and dioxane is readily obtained by the reaction of tetramethylene diamine with cyanogen in an alcoholic menstruum at low temperatures and subsequently refluxing the reaction product whereby ammonia is evolved and the thus formed 2,2'-bis-(4,5,6,7-tetrahydro-1,3-diazepine) is recovered from the reaction mixture. 2,2'-bis-(4,5,6,7-tetrahydro-1,3-diazepine) and its method of preparation are described and claimed in U.S. Patent No. 2,819,262, the subject matter of which is incorporated herein by reference.

The exact structure of the nickel halide complex of 2,2'-bis-(4,5,6,7-tetrahydro-1,3-diazepine) is not known. Indeed, it appears likely that one or more of a series of various complexes may be formed in the reaction mixture as indicated by the fact that a mole ratio of nickel halide to 2,2'-bis-(4,5,6,7-tetrahydro-1,3-diazepine) of 2 to 1 to 1 to 4 may be employed with good success. In general, however, a mole ratio of nickel halide to 2,2'-bis-(4,5,6,7-tetrahydro-1,3-diazepine) of 2 to 1 to 1 to 1 is preferred. Consequently, the failure to postulate such structure is not deemed to be restrictive of the present claims to the use of such complex compound in the synthesis of acrylic acid or of acrylic acid esters and to the complexes per se.

Expressed on a weight basis, the 2,2'-bis-(4,5,6,7-tetrahydro-1,3-diazepine) activator may be employed in an amount of from about 0.1 to 10 percent by weight of the non-gaseous reaction mixture. Because of economical considerations, it is usually desirable to employ from 0.2 to 5 percent by weight of 2,2'-bis-(4,5,6,7-tetrahydro-1,3-diazepine).

It is not necessary to prepare the nickel halide complex of 2,2'-bis-(4,5,6,7-tetrahydro-1,3-diazepine) prior to the start of the reaction. In most cases, a complex may be allowed to form in the reaction medium by adding the nickel halide and 2,2'-bis-(4,5,6,7-tetrahydro-1,3-diazepine) in necessary and desired amounts separately or concurrently.

Although the reason for the high activity of the catalyst complex formed from a nickel halide and 2,2'-bis-(4,5,6,7-tetrahydro-1,3-diazepine) is not entirely understood, it has been found that the complex is markedly more effective for both the production of acrylic acid and acrylic acid esters than a nickel halide alone.

Typical illustrative nickel halides which may be employed to form complexes with 2,2'-bis-(4,5,6,7-tetrahydro-1,3-diazepine) are nickel iodide, nickel bromide and nickel chloride and mixtures thereof. The amount of nickel halide employed is usually from about 0.05 to about 5 percent by weight of the non-gaseous reaction mixture.

If acrylic acid is to be prepared, it is generally advantageous to employ in combination with the nickel halide and 2,2'-bis-(4,5,6,7-tetrahydro-1,3-diazepine) a copper salt in an amount approximately equivalent to that of nickel halide. Illustrative of the copper salts which may be employed with good success are copper iodide, copper bromide and copper chloride. In a similar manner, any of a number of various copper hydrocarbon sulfonates may also be used in combination with a nickel halide and 2,2'-bis-(4,5,6,7-tetrahydro-1,3-diazepine). The use of a copper hydrocarbon sulfonate in combination with a nickel halide in the synthesis of acrylic acid is described and claimed in copending application Serial No. 776,403, filed November 26, 1958, now United States Patent No. 3,025,322, of which one of the inventors herein is also a coinventor.

It is an advantage of this invention that the process may be conducted batchwise or in a semi-continuous or even continuous manner and, if desired, in the presence of an inert solvent which is inert to the reactants under the reaction conditions and miscible with water or alcohol reactant. The solvents, therefore, should not contain free hydroxy, mercapto or carboxy groups, olefinic or acetylenic linkages, primary or secondary amine groups or other non-inert groups. The boiling points of the solvents should be preferably below that of acrylic acid or of the acrylic acid ester. Among the preferred solvents are cyclic ethers such as tetrahydrofuran, dioxane and the like and saturated aliphatic ketones such as acetone, methyl ethyl ketone, diethyl ketone and the like.

While a slight excess of solvent with respect to the water or alcohol reactant employed is suitable, for example, three parts by volume of solvent for two parts by volume of water or alcohol, a greater excess of the liquid or organic solvent is preferred. In the instant invention, a volume ratio of solvent to the water or alcohol reactant in the range of from about 7 to 3 to about 9 to 1 is desirable.

Usually, however, in the preparation of an acrylic acid ester according to the process of this invention a solvent is not required. Thus, the alcohol reactant readily serves as the liquid reaction medium in which the nickel halide and 2,2'-bis-(4,5,6,7-tetrahydro-1,3-diazepine) are soluble under the conditions of reaction.

While an equimolar ratio of acetylene to carbon monoxide is generally used, however, the use of an excess of either of these reactants up to about 100 molar percent is also contemplated.

In the production of acrylic acid esters in accordance with the present invention there may be used saturated monohydric alcohols of the aliphatic series having primary, secondary or tertiary groupings. Thus, for example, methanol, ethanol, propanol, iso-propanol, n-butanol, iso-butanol, sec-butanol, t-butanol, amyl alcohol, octyl alcohol, lauryl alcohol; cyclic alcohols such as cyclohexanol, methylcyclohexanol and polyhydric alcohols such as ethylene glycol, propylene glycol and glycerine may all be used.

In general, pressures of from about 200 to about 900 p.s.i.g. and preferably from 250 to 750 p.s.i.g. are used. The temperature employed in the synthesis of acrylic acid and acrylic acid esters according to the present invention may vary in range from about 150 to about 250° C.

In order to facilitate an understanding of the present invention, the following illustrative examples are given:

EXAMPLE 1

*Preparation of nickel bromide complex of 2,2'-bis-(4,5,6,7-tetrahydro-1,3-diazepine)*

A sample of 4 parts of 2,2'-bis-(4,5,6,7-tetrahydro-1,3-diazepine) is dissolved in the minimum volume of acetone. An acetone solution saturated with $NiBr_2 \cdot 3H_2O$ is added with stirring at room temperature. An immediate precipitate appears, progressively changing from white to brown to blue and finally to light green. The solution is filtered and the precipitate is washed with cold acetone and dried.

Analysis for $C_{10}H_{27}N_4O_5Ni_2Br_3$: Calculated—C, 18.76; H, 4.25; N, 8.75; O, 12.49; Ni, 18.33; Br, 37.43. Found—C, 18.56; H, 4.06; N, 8.12; O, 11.00; Ni, 16.4; Br, 38.57.

EXAMPLE 2

*Preparation of acrylic acid esters*

A. BUTYL ACRYLATE

A solution of 0.764 g. (12.6 mmoles) of the complex of $NiBr_2 \cdot 3H_2O$ and 2,2'-bis-(4,5,6,7-tetrahydro-1,3-diazepine), as prepared in Example 1, in 150 ml. n-butanol is placed in a pressure vessel and heated to 180° C. A gaseous mixture consisting of two parts of acetylene and one part of carbon monoxide is added until the total pressure is 444 p.s.i.g. Rocking is started and the pressure drop is observed with time. It required 13.5 minutes for a 100 p.s.i.g. pressure drop.

Under identical conditions, a solution of 10 mmoles of $NiI_2$ required 34.3 minutes for a 100 p.s.i.g. pressure drop and a solution of 10 mmoles of $NiBr_2$ required 21.3 minutes at the much higher temperature of 200° C. Ordinarily, $NiI_2$ is normally a more active catalyst than $NiBr_2$ at a given temperature. Thus, that the complex of $NiBr_2 \cdot 3H_2O$ and 2,2'-bis-(4,5,6,7-tetrahydro-1,3-diazepine) was effective in reducing the reaction induction time, as indicated by pressure drop, to almost one-third of that achieved when $NiI_2$ was employed at the same temperature was totally unexpected.

The reaction mixture is fractionally distilled to recover unreacted butanol and n-butyl acrylate.

B. BUTYL ACRYLATE

A solution of 0.760 g. (15 mmoles) of the complex of $NiCl_2 \cdot 6H_2O$ and 2,2'-bis-(4,5,6,7-tetrahydro-1,3,-diazepine), prepared in accordance with the procedure of Example 1, in 150 ml. butanol is placed in a pressure vessel and heated to 180° C. A gaseous mixture consisting of two parts of acetylene and one part of carbon monoxide is added until the total pressure is 440 p.s.i.g. Rocking is started and the pressure drop is observed with time. It required 28.3 minutes for a 100 p.s.i.g. pressure drop.

Under identical conditions, a solution of 10 mmoles of $NiI_2$ required 44.6 minutes for a 100 p.s.i.g. pressure drop and a solution of 10 mmoles of $NiBr_2$ required 36.2 minutes and the much higher temperature of 200° C.

The reaction mixture is fractionally distilled to recover unreacted butanol and n-butyl acrylate.

C. ETHYL ACRYLATE

A solution of 0.764 g. (12.6 mmoles) of the complex of $NiBr_2 \cdot 3H_2O$ and 2,2'-bis-(4,5,6,7-tetrahydro-1,3-diazepine) of Example 1 in 150 ml. ethanol is placed in a pressure vessel and heated to 180° C. A gaseous mixture consisting of two parts of acetylene and one part of carbon monoxide is added until the total pressure is 450 p.s.i.g. Rocking is started and the pressure drop is observed with time. It required 11.0 minutes for a 100 p.s.i.g. pressure drop.

Under identical conditions, a solution of 10 mmoles of $NiI_2$ required 31.2 minutes and a solution of 10 mmoles of $NiBr_2$ required 20.0 minutes and the much higher temperature of 195° C.

Ethyl acrylate is isolated by distillation from the reaction mixture.

D. PROPYL ACRYLATE

A solution of 0.764 g. (12.6 mmoles) of the complex of $NiBr_2 \cdot 3H_2O$ and 2,2'-bis-(4,5,6,7-tetrahydro-1,3-diazepine) of Example 1 in 150 ml. n-propanol is placed in a pressure vessel and heated to 180° C. A gaseous mixture consisting of two parts of acetylene and one part of carbon monoxide is added until the total pressure is 438 p.s.i.g. Rocking is started and the pressure drop observed with time.

Under identical conditions, a solution of 10 mmoles of $NiBr_2$ required 22.4 minutes and the much higher temperature of 200° C.

n-Propyl acrylate is isolated from the reaction mixture by fractional distillation.

EXAMPLE 3

*Preparation of acrylic acid*

A solution consisting of 12 parts of water, 88 parts of acetone, 0.5 part of the complex of $NiBr_2 \cdot 3H_2O$ and 2,2'-bis-(4,5,6,7-tetrahydro-1,3-diazepine), 0.1 part hydroquinone is charged to a suitable stainless steel rocking autoclave. The autoclave is then evacuated and purged with nitrogen three times. The vessel is heated to 185° C. and an approximately equimolar mixture of acetylene and carbon monoxide is added until the total pressure is 700 p.s.i.g. Rocking is started and the pressure is observed to fall 100 p.s.i.g in 12.7 minutes. It is repressured several times, the reaction mixture cooled, vented and acrylic acid isolated by fractional distillation.

While the present invention has been described in detail as to specific embodiments thereof, it is not intended that these details constitute undue limitations upon the scope of the invention, excepting, of course, insofar as these limitations appear in the appended claims.

We claim:

1. In a process for the preparation of acrylic acid and acrylic acid esters by the reaction of acetylene, carbon monoxide and a compound selected from the group consisting of water and an aliphatic saturated monohydric alcohol in the presence of a nickel halide catalyst, the improvement which comprises carrying out said reaction in the presence of 2,2'-bis-(4,5,6,7-tetrahydro-1,3-diazepine) represented by the general formula $$\begin{array}{c} CH_2-CH_2-N \\ | \\ CH_2-CH_2-NH \end{array} \!\!\! \begin{array}{c} \diagdown \\ C-C \\ \diagup \end{array} \!\!\! \begin{array}{c} NH-CH_2-CH_2 \\ | \\ N-CH_2-CH_2 \end{array}$$

in a small amount sufficient to form a complex compound with the nickel halide.

2. A process according to claim 1 in which the nickel halide is nickel bromide.

3. A process according to claim 1 in which the nickel halide is nickel chloride.

4. A process according to claim 1 in which the nickel halide is nickel iodide.

5. A process according to claim 1 in which 2,2'-bis-(4,5,6,7-tetrahydro-1,3-diazepine) is present in an amount of from about 0.1 to about 10% by weight of the non-gaseous reaction mixture.

6. A process according to claim 1, in which said reaction is carried out at from about 150° C. to about 250° C. at a pressure of from about 250 pounds to about 750 pounds, and in which a volume ratio of solvent to said compound reactant is in a relative range of from about 7:3 to about 9:1.

7. In a process for the preparation of acrylic acid by the reaction of acetylene, carbon monoxide and water in the presence of a catalyst combination comprising a nickel halide and a copper salt selected from the group consisting of copper iodide, copper bromide, copper chloride and copper hydrocarbon sulfonates, the improvement which comprises carrying out said reaction in the presence of 2,2'-bis-(4,5,6,7-tetrahydro-1,3-diazepine) represented by the general formula:

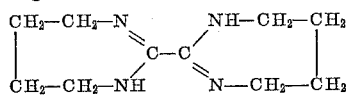

8. A process according to claim 7 in which 2,2'-bis-(4,5,6,7-tetrahydro-1,3-diazepine) is present in an amount of from about 0.1 to about 10% by weight of the non-gaseous reaction mixture.

9. A process according to claim 8 in which said complex is formed from nickel bromide and 2,2'-bis-(4,5,6,7-tetrahydro-1,3-diazepine).

10. A process according to claim 8 in which said complex is formed from nickel chloride and 2,2'-bis-(4,5,6,7-tetrahydro-1,3-diazepine).

11. A process according to claim 8 in which said complex is formed from nickel iodide and 2,2'-bis(-4,5,6,7-tetrahydro-1,3-diazepine).

12. In a process for the preparation of acrylic acid and acrylic acid esters by the reaction of acetylene, carbon monoxide and a compound selected from the group consisting of water and an aliphatic saturated monohydric alcohol at elevated temperatures and pressures, the improvment therein which comprises carrying out said reaction in the presence of a nickel halide complex of 2,2'-bis-(4,5,6,7-tetrahydro-1,3-diazepine).

References Cited by the Examiner

UNITED STATES PATENTS

| | | | |
|---|---|---|---|
| 2,542,610 | 2/51 | Young | 252—429 |
| 2,644,798 | 7/53 | Calfee et al. | 252—429 |
| 2,819,262 | 1/58 | Matsuda | 260—239 |
| 2,854,458 | 9/58 | Reppe et al. | 260—239 |
| 2,886,591 | 5/59 | Lautenschlager et al. | 260—533 |
| 2,897,195 | 7/59 | Mull | 260—239 |
| 2,925,436 | 2/60 | Reppe et al. | 260—533 |
| 3,023,237 | 2/62 | Reppe et al. | 260—533 |
| 3,025,322 | 3/62 | Smolin et al. | 260—533 |

LORRAINE A. WEINBERGER, *Primary Examiner.*

CHARLES B. PARKER, LEON ZITVER, *Examiners.*